(12) United States Patent
Garg et al.

(10) Patent No.: US 7,966,279 B2
(45) Date of Patent: Jun. 21, 2011

(54) DATA VALIDATION USING SIGNATURES AND SAMPLING

(75) Inventors: Neeraj Garg, Redmond, WA (US); Cale D. Carter, Redmond, WA (US); Kulothungan Rajasekaran, Sammamish, WA (US); Deuane J. Martin, Seattle, WA (US); Pankaj K. Singh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 12/358,666

(22) Filed: Jan. 23, 2009

(65) Prior Publication Data

US 2009/0132461 A1 May 21, 2009

Related U.S. Application Data

(62) Division of application No. 10/447,087, filed on May 28, 2003, now Pat. No. 7,484,096.

(51) Int. Cl.
*G06F 17/00* (2006.01)
*G06N 7/00* (2006.01)

(52) U.S. Cl. ................ 706/54; 706/53; 706/56

(58) Field of Classification Search ............... None
See application file for complete search history.

(56) References Cited

U.S. PATENT DOCUMENTS

| | | | |
|---|---|---|---|
| 4,570,217 A | 2/1986 | Allen et al. | |
| 5,051,745 A | 9/1991 | Katz | |
| 5,138,615 A | 8/1992 | Lamport et al. | |
| 5,592,618 A * | 1/1997 | Micka et al. | 714/54 |
| 5,727,202 A | 3/1998 | Kucala | |
| 5,790,776 A | 8/1998 | Sonnier et al. | |
| 5,805,699 A | 9/1998 | Akiyama et al. | |
| 5,832,489 A | 11/1998 | Kucala | |
| 5,872,971 A | 2/1999 | Knapman et al. | |
| 5,884,323 A | 3/1999 | Hawkins et al. | |
| 5,907,703 A | 5/1999 | Kronenberg et al. | |
| 5,978,814 A | 11/1999 | Miller et al. | |
| 6,021,491 A * | 2/2000 | Renaud | 713/179 |
| 6,049,861 A | 4/2000 | Bird et al. | |
| 6,094,684 A | 7/2000 | Pallmann | |

(Continued)

FOREIGN PATENT DOCUMENTS

EP 0717353 A2 6/1996

OTHER PUBLICATIONS

B. Awerbuch and L.J. Schulman, "The Maintenance of Common Data in Distributed System", Journal of the ACM, vol. 44 No. 1, 1997, 17 pages.

(Continued)

*Primary Examiner* — Jeffrey A Gaffin
*Assistant Examiner* — Adrian L Kennedy
(74) *Attorney, Agent, or Firm* — Shook, Hardy & Bacon, L.L.P.

(57) ABSTRACT

Architecture that facilitates validation of a data mapping of data from a data source to a data target. There is included a signature generation component that generates a source signature of all or a portion of the data source and a target signature of all or a corresponding portion of the data target, and a sampling component that obtains a sample of the source data a corresponding sample of the target data. The data signatures and data samples are compared respectively and processed with a processing component to determine the status of the validation process.

5 Claims, 8 Drawing Sheets

U.S. PATENT DOCUMENTS

| | | | |
|---|---|---|---|
| 6,151,689 | A | 11/2000 | Garcia et al. |
| 6,202,207 | B1 | 3/2001 | Donohue |
| 6,253,213 | B1 | 6/2001 | Vanderschaaf |
| 6,438,724 | B1 | 8/2002 | Cox et al. |
| 6,446,234 | B1 | 9/2002 | Cox et al. |
| 6,470,448 | B1 | 10/2002 | Kuroda et al. |
| 6,519,733 | B1 | 2/2003 | Har et al. |
| 6,529,506 | B1 * | 3/2003 | Yamamoto et al. ............ 370/389 |
| 6,587,577 | B1 * | 7/2003 | Finkelstein ................... 382/123 |
| 6,647,494 | B1 | 11/2003 | Drews |
| 6,665,725 | B1 | 12/2003 | Dietz et al. |
| 6,823,398 | B1 | 11/2004 | Lee et al. |
| 6,850,252 | B1 | 2/2005 | Hoffberg |
| 6,901,398 | B1 | 5/2005 | Horvitz et al. |
| 6,938,109 | B1 | 8/2005 | Sliger et al. |
| 6,975,727 | B1 | 12/2005 | Vandergeest |
| 7,010,052 | B2 | 3/2006 | Dill et al. |
| 7,128,270 | B2 | 10/2006 | Silverbrook et al. |
| 7,200,603 | B1 | 4/2007 | Hitz et al. |
| 2001/0043603 | A1 | 11/2001 | Yu |
| 2002/0116404 | A1 | 8/2002 | Cha et al. |
| 2003/0028867 | A1 | 2/2003 | Kryloff et al. |
| 2003/0088791 | A1 | 5/2003 | Porras et al. |
| 2003/0144990 | A1 | 7/2003 | Benelisha et al. |
| 2004/0133629 | A1 | 7/2004 | Reynolds et al. |
| 2004/0177110 | A1 | 9/2004 | Rounthwaite et al. |
| 2004/0215977 | A1 | 10/2004 | Goodman et al. |
| 2005/0055385 | A1 | 3/2005 | Sinha et al. |
| 2006/0110199 | A1 | 5/2006 | Walmsley et al. |
| 2006/0248128 | A1 | 11/2006 | Acharya et al. |

OTHER PUBLICATIONS

J. Cho and H. Garcia-Molina, "Synchronizing a Database to Improve Freshness", Proceedings of the 2000 ACM SIGMOD Conference, pp. 117-128, 2000.

W. Hou and Z. Zhang, "Enhancing Database Correctness: a Statistical Approach", Proceedings of the 1995 ACM SIGMOD Conference, pp. 223-232, 1995.

Kim, et al.,"The Design and Implementation of Tripwire: A File System Integrity Checker", Nov. 1994, ACM Proceedings of the 2nd ACM Conference on Computer and Communications Security, ACM, pp. 18-29.

Kespret, Pkzip, Lharc & Co., The Ultimate Data Compression Book, Dec. 1995, Abacus, A Data Becker Book, pp. 2, 207, 152-153, 222-232.

Chawathe, et al., "Meaningful Change Detection in Structured Data", 1997, ACM SIGMOND, ACM, pp. 26-37.

Terran Lane and Carla E. Brodley, "Detecting the Abnormal: Machine Learning in computer Security", School of Electrical and Computer Engineering, Jan. 31, 1997, 20 pages.

Sangeun Kim, Peter In, and Ramesh Bharadwaj, "An Extended Framework for the Validation and Verification of Situation-Aware Middleware Architectures", In Proceedings Ground Systems Architectures Workshop, Mar. 2003, 3 pages.

Non-final Office Action mailed Jun. 10, 2010 in U.S. Appl. No. 12/358,695.

* cited by examiner

US 7,966,279 B2

DATA VALIDATION USING SIGNATURES AND SAMPLING

CROSS-REFERENCE TO RELATED APPLICATIONS

This application is a divisional of U.S. patent application Ser. No. 10/447,087, filed May 28, 2003, entitled, "DATA VALIDATION USING SIGNATURES AND SAMPLING", the entirety of which is incorporated herein by reference.

TECHNICAL FIELD

This invention is related to a technique for checking data integrity during a data migration.

BACKGROUND OF THE INVENTION

Migrating data from one application to another is a very fundamental widespread business problem because the underlying formats and structures are different. In some respects, such data migrations between disparate applications is similar to translating from one natural language to another, e.g., English to Russian. While the context may be the same, e.g., "customer owes &25 per month", the underlying representative structure using words, grammar, and sentences is very different. Simply comparing word-for-word across languages does not work. Moreover, simply expressing the tense or structure does not facilitate the process.

Additionally, there is little time to certify that a migration performed in a production environment is correct, even if the strategy has been tested in a test environment. Where large volumes of data are involved and sufficient test resources are unavailable, it becomes extremely problematic and, in most cases, impractical to manually inspect each record to confirm that the "intent" has been conveyed correctly.

Conventional techniques for checking data integrity during transmission include a cyclic redundancy check checksum, which is widely used to ensure that files are copied correctly. Other networking protocols also use a number of "redundant codes" to ensure correctness of data transmission. Data sampling for testing integrity is also widely used. However, in all of these cases, the data is not structured differently.

What is needed is architecture that can provide a high level of confidence that data transitioned from a first location to a second location or a first state to a second state can be reliably certified as being processed correctly.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a test suite that is applicable whenever data is migrated from one application to another, and involves expedient verification of the entire dataset with a high confidence in correctness of the data involved. A source data signature may be generated for the entire source data or only a portion thereof utilizing a signature algorithm, in addition to a destination data signature being generated for the entire destination data or a corresponding portion thereof.

The signature algorithm may include what is called, a domain specific statistical signature (DSSS) technology that consists of a highly lossy compression of some portion or all of a set of the source and target data. The source and target signatures are then compared to output a signature result. The use of DSSS may not ensure that data conversion and/or migration were performed correctly even when the signature from the source data matches the signature from the target (or destination) data, since it is possible that two signatures derived by DSSS from two different datasets may produce the same signature. Thus there is also provided a sampling process that adds to a level of confidence of the validation process by sampling a portion of the raw source data and the corresponding portion of the raw destination data, which samples are obtained for more detailed comparison and the result of which is raw data output. The signature result and the raw data sample output are then processed, for example, logically, to arrive at a result (or "answer") that indicates whether the migration was successful or unsuccessful. Note that output processing may be according to any desired algorithm considered to combine the signature and sampling into a final number representative of accuracy. Still further, the process may be manual, in that a human receives as input the signature and samplings and makes a decision. A validation (or confidence) parameter may also be provided that indicates with some level of confidence that the data migration was successful. In any case, combining the signatures and the samplings is an optional task that may be automated or performed manually. If automatically, the algorithm may be complex including, but not limited to fuzzy logic, a table lookup, mathematical expression, custom formula, and Boolean logic.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
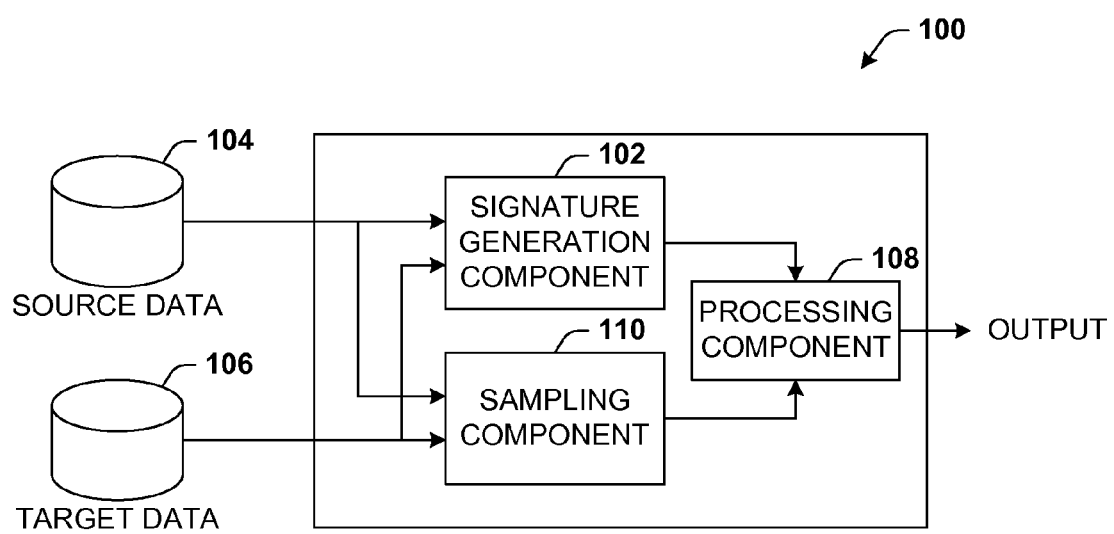
FIG. 1 illustrates a general block diagram of a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a general block diagram of a system 100 of the present invention. The system 100 includes a data certification or validation feature that provides some level of confidence that when comparing at least two datasets, the user can determine the equivalency thereof. The system 100 includes a signature generation component 102 that generates a signature for each of an entire source dataset 104 and an entire target dataset 106 or corresponding portions thereof. The signature may be derived by a signature engine that processes the datasets (104 and 106) into what is hereinafter referred to as a domain specific statistical signature (DSSS).

Some examples of DSSS include the following: a tabulation of "money owed to company" vs. "number of people"; a tabulation of the "city of residence" vs. "number of people"; and a tabulation of the "last four digits of credit card number" vs. "number of credit cards" in the system. While all examples are "tabulations", in the examples, DSSS can be arbitrary set of data that is produced.

DSSS has the properties that a version of the signature is produced from the data maintained for the source application as well as the target application; DSSS are fast to compute on both data sources and data targets, although fast computational speed may not be required; and, there exist fast algorithm(s), which optionally can be utilized to compare the signatures produced by the source data and the target data.

In the example provided earlier, the algorithm for comparing the signatures is simple table comparison. If specification of the formatting is agreed upon, then a simple binary "diff" is sufficient to discern whether or not data conversion has been carried out correctly.

As indicated hereinabove, since statistical signatures effectively do a highly lossy compression of the dataset into a small signature, it is possible that the compression of two different datasets will result in the same signature. This means that even when the signature from the source matches the signature from the target, it is still not proof that data conversion has been correctly carried out. For example, suppose the association of account-id and customer name was migrated incorrectly. In this case, the count of the number of customers with any particular name will still match, though customer name will be wrong for almost all of the accounts.

In order to prevent these systematic errors, the sampling component is added. A set of accounts is chosen from the source data 104, and the same set of accounts is chosen from the target data 106. The attributes of these sampled accounts are then compared in greater detail (without compression) then the signatures themselves. This comparison may involve some expensive and/or slow algorithm or operations, e.g., manual comparison. However, in more robust implementations, the comparison may be performed automatically at a low level using, for example, a statistical compare algorithm operation that achieves some level of certainty that the comparison is valid.

These two strategies of signature generation and sampling provide a high level of confidence that data has been migrated correctly. Further increasing the number of signatures and decreasing the compression can increase the confidence. For example, it is to be appreciated that correct data may be transmitted incorrectly causing the received data to include errors. This type of error may be substantially reduced or eliminated by generating multiple signatures from the same data source and data target. Thus if three signatures are generated and one differs from the other two, it may be assumed that the two like signatures are the correct ones. This, of course, requires additional computing resources to perform. Additionally, the level of compression may be relaxed. If high compression is used, the computing resources required are greater than if the level of compression were low. Both of these techniques result in extra cost providing a continuous curve of "cost versus confidence" trade-offs. Additionally, each signature can have different levels of compression, based on importance of the signature for the correctness of data. In the case of no compression, the data is compared in its raw state.

Continuing from above, these two signatures are then compared utilizing a processing component 108 to determine the equivalency of the signature outputs. This provides a first level of confidence that the datasets (104 and 106) are the same. Note however, that the signature engine may be any algorithm that converts the datasets (104 and 106) into a common signature "language" that may be compared. In order to obtain the highest level of confidence with respect to dataset signatures, the user would ensure that all records of the datasets are utilized in the signature-generation process. However, this may become problematic when handling large datasets. Thus, as will be described in greater detail hereinbelow, other techniques may be employed to reduce the time required to process the entire datasets (104 and 106) into signatures that may then be compared.

The system 100 also includes a sampling component 110 that provides an additional level of confidence by obtaining samples from each dataset (104 and 106) that are directly comparable. The sampling component 110 obtains one or more similar data samples from each of the source dataset 104 and the target dataset 106. What the particular samples are may be predetermined according to type of records, size of records, and other criteria, or arbitrarily as long as the two samples are comparable. Once the samples are obtained from each of the datasets (104 and 106), a comparison is made using the processing component 108 to determine the output. If both the signature and the sample comparisons processes are favorable, the user may be assured to some degree that the datasets (104 and 106) are equivalent.

Of course, if the compare result of either the signature component or the sampling component is not favorable the datasets (104 and 106) may be determined to be different. That is, if the signature is calculated more quickly such that the result is arrived at first, and that result is unfavorable, there is no need to perform the sampling process. The same holds true for sampling; if the sampling process may be performed more quickly than the signature process, and the sampling results are different, there is no need to perform or continue to perform the signature process. However, it should be appreciated that where such data is deemed to be very important, the user may wish to allow both the signature and sampling processes to complete, such that the user is certain that both processes arrive at the same result, whether both favorable or both unfavorable. If, for example, the signature process is favorable, and the sampling process is unfavorable, the user may then run the processes again.

The system 100 may also be used to generate signatures and obtain samples on subsets of the datasets (104 and 106). For example, if the source data 104 comprises two tables: Names and Addresses, a signature may be generated on the Names table at the source data 104 and the corresponding Names table at the target data 106. Similarly, the sampling component 110 may be configured to sample the Names tables of both the source 104 and target 106. The confidence level will then be lower since the data is less than the total datasets. The user may also chose to create a signature on both the Names and Addresses tables, and perform the comparison in a single query.

The present invention finds application at least with respect to data migration between similar applications. Thus the user expects that the signature process and the sampling process should return favorable results for the datasets (104 and 106) to be equivalent. Note also that the system may be utilized to obtain a sampling first, and then generate a signature from that sample. However, such an operation provides a lower level of confidence.

However, the architecture of the present invention also provides utility with disparate systems that use unlike databases or data structures. This is because the signature-generation process facilitates creating a "common language" through the use of the signatures. Thus although there may be, for example, two totally different datasets (104 and 106) that are not directly comparable in raw form, the conversion of both datasets (104 and 106) to a common signature type provides for subsequent processing using the common signature language.

Figure 2:
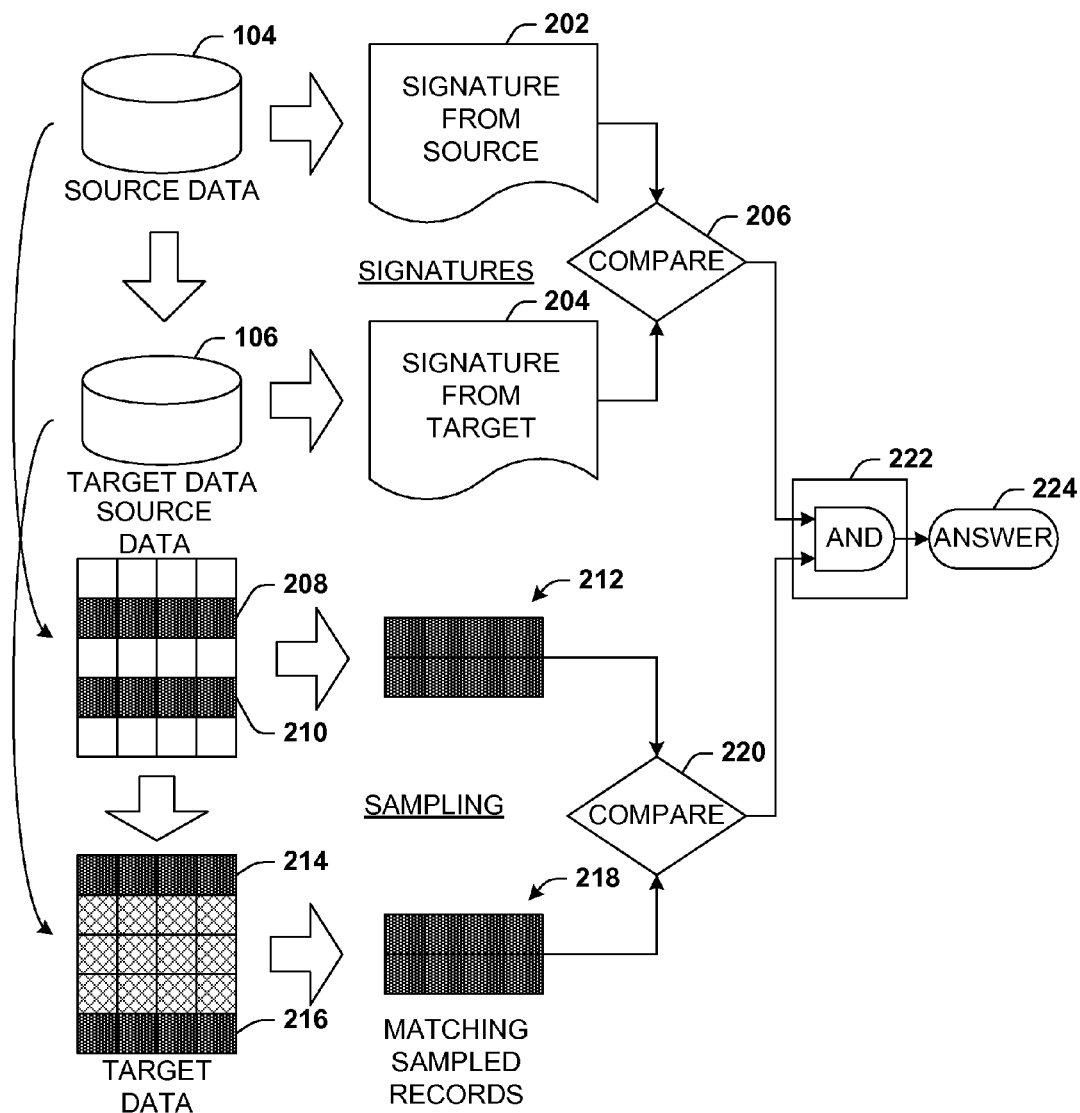
FIG. 2 illustrates a more detailed block diagram of the signature and sampling process of the present invention.

Referring now to FIG. 2, there is illustrated a more detailed block diagram of the signature and sampling process of the present invention. There are provided the two datasets, the source data 104 and the target data 106, that are being tested (or validated) for equivalency. This may occur, for example, in a data migration scenario for the transfer of data from one location to another location, and for migration of data from one application to its updated version. The signature engine generates a corresponding source signature 200 for all of the source data 104 and a target signature 202 for all of the target data 106. These signatures are then compared with a compare process 206 to arrive at a signature compare result.

The sampling process includes choosing a record (or set of records) (208 and 210) from a portion of the source data 104, now grouped as a record or records 212, and choosing that same record (or set of records) (214 and 216) of data from the target dataset 106, now grouped as a record or records 218. The source and target record(s) (212 and 218) are then compared in a compare process 220 to arrive at a sampling compare result. The signature compare result and the sampling compare result are then logically combined (or filtered) with logic 222 (here, logically AND'ed) to arrive at an Answer 224. In the case of data migration, the expected answer for a successful data migration may be a logical TRUE, indicating that both the source and target dataset (104 and 106) compare sufficiently favorably to be considered equivalent.

Logical combination is one of the options. This combination could be any general "combinator", based on a number of different possible algorithms. Any component that takes two inputs and returns an output suitable for consumption by the decisionmaker could be used. Neither the input to these combinatory nor the output needs to be a single number. Output needs to be something that a decisionmaker can comprehend in order to make a decision. In the trivial case: the combinator just passed all the input directly to the decision maker, who has to understand the data a lot and make a decision. In the other extreme, the combinatory will produce a single YES/NO answer, could produce a number between 0 and 1 to indicate confidence level, or could just return a TRUE/FALSE answer. There is a trade-off in complexity of design of the combinatory versus complexity of the output. The combinatory could apply any algorithm, using for example, custom logic, statistical/probabilistic analysis, a trained neural network, decision tree, and support vector machine. These algorithms are provided as an example. Other existing algorithms and new algorithms/systems developed for classification could be employed.

Figure 3:
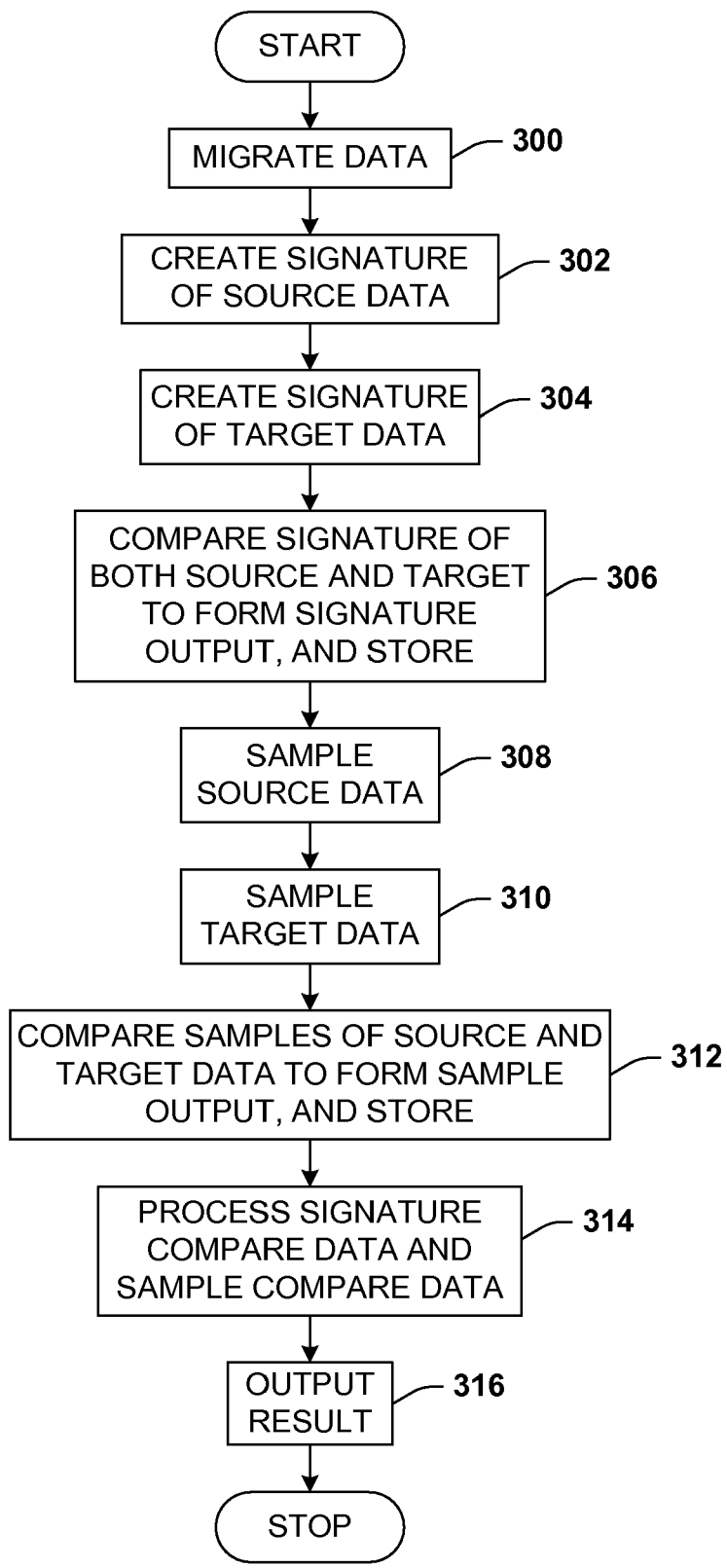
FIG. 3 illustrates a flow chart of the methodology for data validation of the present invention.

Referring now to FIG. 3, there is illustrated a flow chart of the methodology for data validation of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Flow begins at a Start block and proceeds to 300 where data migration is performed. As mentioned previously, however, the methodology is not limited to data migration applications, but may be utilized in other ways described in more detail hereinbelow. At 302, the signature component generates a signature for the source data. At 304, the signature component generates a signature for the target data. The source and target signatures are then compared, as indicated at 306 to form the signature compare output. The output is then stored. At 308, the sampling process begins by sampling the source data. At 310, the target data is sampled. At 312, the samples are then compared to output a sample compare result, which is then stored. The signature compare output and sample compare output are then processed together, as indicated at 314, to output the "answer", as further indicated at 316. The process then reaches a Stop block.

As indicated previously, the methodology may be implemented such that either the signature process or the sampling process may be performed first. Thus if the process that is first performed yields an unfavorable result, the whole process may be stopped at that point.

Figure 4:
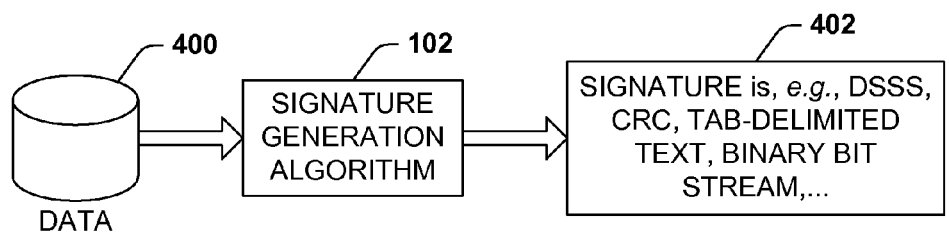
FIG. 4 illustrates a general signature generation diagram.

Referring now to FIG. 4, there is illustrated a general signature generation diagram. The signature algorithm 102 of the present invention may develop a signature 402 from a dataset 400 by any number of conventional means. For example, the disclosed DSSS process creates a signature in the format of tab-delimited text that may be imported into a spreadsheet for review and analysis. Other conventional means include processing the dataset 400 into a CRC (cyclic redundancy check) value. Another conventional means may simply be to provide as a low-level signature, a binary bit stream, or a hash total of the data 400 according to a particular hash function. In any case, the output signature may be processed accordingly to provide a means of comparing the signatures of various data sources.

Figure 5:
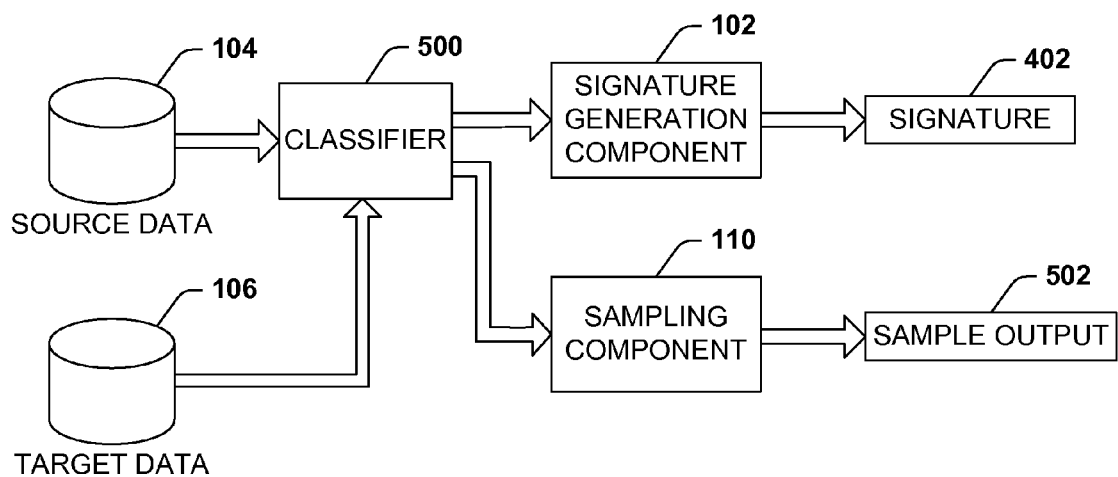
FIG. 5 illustrates the use of a classifier to provide a classification mechanism for determining an optimized operating regime of the present invention.

Referring now to FIG. 5, there is illustrated a classifier 500 to provide a classification mechanism for determining an optimized operating regime of the present invention. The subject invention (e.g., in connection with data migrations) may employ various artificial intelligence based schemes for carrying out one or more aspects of the subject invention. The classifier 500 may be used with either the signature component 102 to generate the signature 402 or the sampling component 110 to generate a sampling output 502. The classifier 500 may also be implemented for use with both components (103 and 110). For example, where less than all of the source data 104 may be selected for creating the signature 402, a process for determining which portion(s) of the source data 104 or how much of the source data 104 is to be selected for use by the signature algorithm 102 may be facilitated via an automatic classification system and process. Such classification may employ a probabilistic and/or statistical-based analysis (e.g., factoring into the analysis utilities and costs) to prognose or infer an action that a user desires to be automatically performed. The classifier 500 may also output a result that is reviewed by a human as the ultimate decisionmaker of the process. For example, the classifier 500 may be employed, as well as other classification approaches that include support vector machines, Bayesian networks, decision trees, and probabilistic classification models providing different patterns of independence. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier(s) is used to automatically determine according to a predetermined criteria which portions or how much of the source data 104 is selected for signature generation. The criteria can include, but is not limited to, the type of source data 104, the amount of the source data 104, the importance of the source data 104 (e.g., financial data versus employment data), the time that the source data 104 is to be processed (e.g., migrated), etc. A classifier is a function that maps an input attribute vector, x=(x1, x2, x3, x4, xn), to a confidence that the input belongs to a class—that is, f(x)=confidence(class). In the case of text based data collection classification, for example, attributes are words or phrases or other data-specific attributes derived from the words (e.g., parts of speech, presence of key terms), and the classes are categories or areas of interest (e.g., levels of priorities).

In furtherance thereof, the classifier 500 may be used to process a reduced set of the source data 104 for generating the signatures, and yet still provide a predetermined level of confidence that the source data 104 and the target data 106 are equivalent. For example, where it is determined that the source data 104 is of utmost importance to the user, the classifier 500 may be configured to utilize all or a very high percentage of the source data 104. Of course, in any case involving signature generation of the source data 104, the same data must be used from the target data 106 to generate a signature that may be compared to the source data signature. The classifier 500 may also be configured to output a confidence parameter such that the user may use the confidence parameter as additional information in deciding if the data migration was successful.

Contrariwise, where the source data 104 was considered to be of very low importance, yet consisting of a large amount of data, and where in combination with other factors it may be considered easily rectifiable, the classifier 500 may be configured to select only a portion of the source data 104 and target data 106 for signature generation to maintain system performance, or to maintain efficient operation in consideration of other system functions deemed to be important.

When generating signatures on a multi-module database, for example, a financials module and a human resources module, the classifier 500 may be configured to provide a higher level of confidence on the financials and a lower level of confidence on the human resources data. This may be accomplished by effecting the level of compression of the source data 104 into a signature. Thus most, if not all, of the financials data may be processed, but a lower amount of the human resources data is utilized to arrive at the answer, which answer indicates a favorable or unfavorable data processing result. This process weights the financial data more heavily than the human resources data in the validation processes of the present invention.

When considering the sampling component 110, the classifier 500 may be used in a similar manner as its optional roles with the signature component 102 by providing a means for selecting records that may be weighted more heavily than others. For example, there may be a data record of the source data 104 that when processed by the database application, provides a consolidated indication of the accuracy of the overall database itself. Thus the classifier 500 may be configured to at least sample this record in both the source data 104 and target data 106.

The classifier 500, as indicated hereinabove, may also be configured to implement various levels of confidence according to the time of the data processing, such that data processed on a weekly basis may be processed at a lower level of confidence than that same data being processed at the end of the month.

Figure 6:
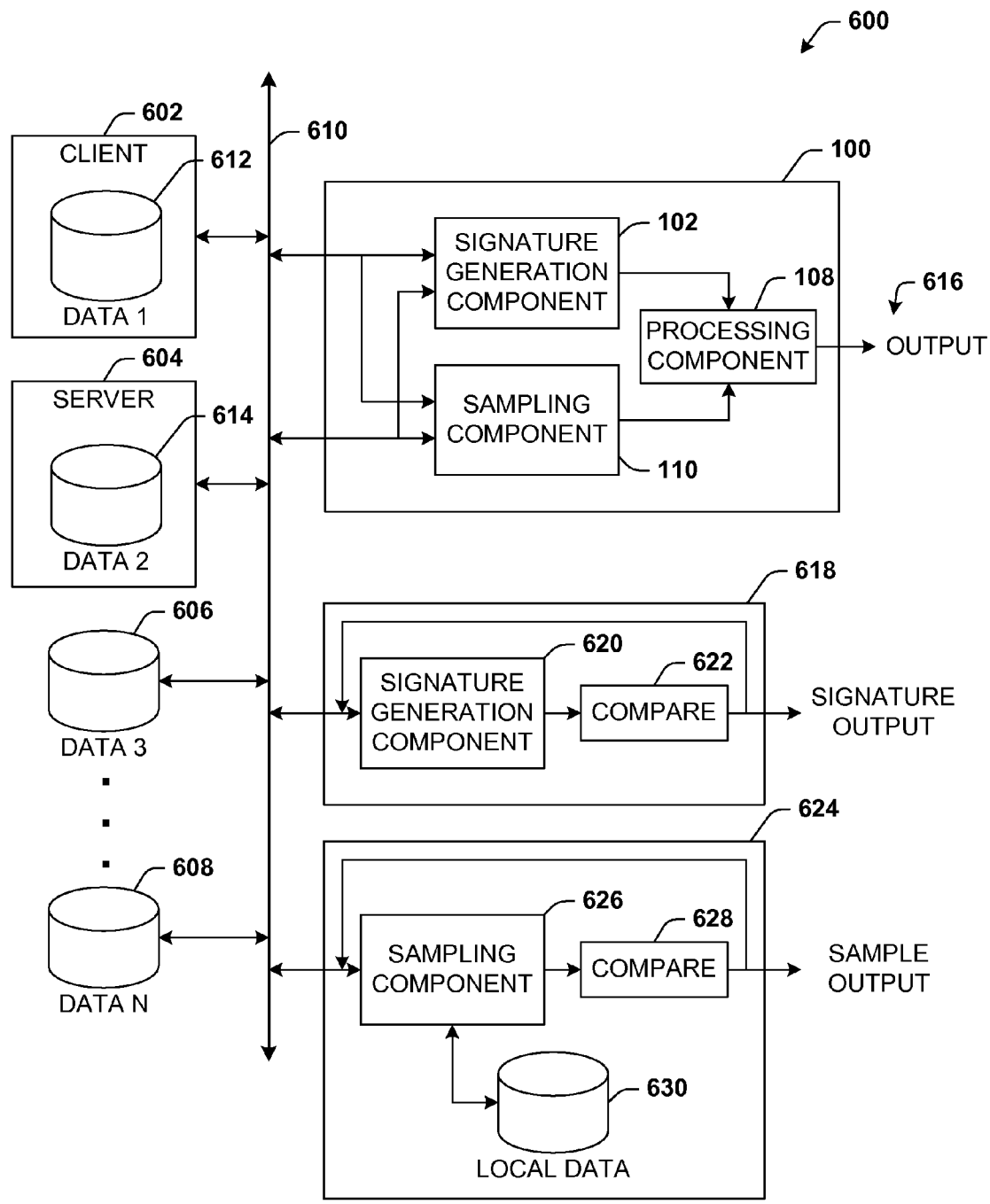
FIG. 6 illustrates a system for searching for a preferred dataset from a plurality of databases.

Referring now to FIG. 6, there is illustrated a system 600 for searching for a preferred dataset from a plurality of databases. This application may be very useful when the system 600 includes a large number of local and/or widely distributed datasets. Such may be the case in a governmental environment that includes a large number of databases on people, demographics, financial information, addresses, or any other information. In furtherance thereof, there is provided the system 600 that includes the networked system 100 of FIG. 1 in communication with one or more of a plurality of databases 602, 604, 606, and 608 (also denoted respectively as DATA1, DATA2, DATA3. DATA N) disposed on a network 610 (e.g., a LAN, WAN, WWAN ... ). The databases may be distributed among both clients and servers, as illustrated, with database 602 configured as part of a client system 612, and the database 604 implemented as part of a server 614.

The system 100 may also be disposed on the network 610, and includes the signature component 100 for generating a signature of one or more of the databases (or datasets) (602, 604, 606, and 608), and the sampling component 110 for providing an additional level of confidence in the data validation process of the present invention, the outputs of are compared with the processing component 108 and processed according to the description provided hereinabove. The system 100 may be employed in any of the systems, including the client 612 and the server 614, and/or as the standalone system 100 without a local database.

In operation, the system 600 provides a means of determining which, if any at all, of the plurality of databases are similar or even equivalent. The system 100 may be so controlled either locally or remotely to access any of at least two databases for generating a signature and for performing the sampling function. For example, the database 602 of the client 612 may be compared with the database 604 of the server 614 to determine if these two datasets are very similar or even equivalent. Of course, the compare process may continue by including any number of the other databases 606 to DATA N. Once completed, the system 100 will then arrive at an output 616 that indicates either favorably or unfavorably the compare processes of the databases.

The SVM described hereinabove may be employed in this process to reduce system load by determining according to some predetermined criteria the amount of data that may be used from each database, if not all of the data, in order to provide the level of confidence desired in the process.

Note that the system 100 may be provided as a modular implementation of separate components disposed in operative communication on the network 610. Thus there is a signature module 618 disposed on the network 610 that includes a signature component 620 (similar to the signature component 102) and an associated compare component 622, that can access one or more of the plurality of databases (602, 604, 606, and 608) for generating signatures thereof. The signature output may be transmitted from the signature module 618 back across the network 610 to the processing component 108 of the system 100 for the comparison and logic processing. Alternatively, the signature output may be processed locally by a local processing component (not shown).

Similarly, there is provided a standalone sampling module 624 for providing the sampling function of the present invention. The sampling module 624 includes a sampling component 626 (similar to the sampling component 110) and an associated compare component 628, for comparing the samples of at least two of the databases. The sample output may be transmitted from the sampling module 624 back across the network 610 to the processing component 108 of the system 100 for the comparison and logic processing with the signature output. Alternatively, the sample output may be processed locally by a local processing component (not shown).

The signature module 618 and the sampling module 624 may also communicate via the network 610 to provide the desired answer output, in the same manner as the system 100. Either the signature module 618 or the sampling module 624 may include a processing function (not shown) to process the signatures and samples to arrive at the validation answer.

It should be appreciated that either or both of the modular components (618 and 624) may also includes a local database. Here, the sampling component 624 includes a local database 630 that may be used as one of the databases to be included in the search process. Thus the signature module 624, and/or the signature component 110 of the system 100 may access the local database 626. Additionally, the sampling component 110 of the system 100, and the sampling component 626 may assess the local database 630.

Note also that the signature and sampling processes may occur in parallel to reduce the time for processing the desired outputs. The outputs may be provided and stored for later analysis depending on the urgency of the output data.

The system 600 of FIG. 6 is also operable to facilitate the signature and sampling process from a single data source or multiple data sources to a single data target or multiple data targets. Where the data source and/or the data target are distributed databases that span several network locations, e.g., the client 602 and data source 606, the system 600 is sufficiently robust to embrace the total source and/or target databases before the signature component 102 derives the signature output. The spanned data sources may be combined at any of a number of locations, which may simply involve the merging of two tables of data.

Thus it is to be appreciated that the data source may be distributed across several network locations, for example, data source 612 and data source 606. Furthermore, the data target may reside at a single location, for example, the data target 614 of the server 604. Thus the signature process includes generating a single signature of the data source, which comprises both the data sources (612 and 606). As indicated herein, the two data sources must first be combined such that the resulting data signature is comparable to the data target signature. The merge process may be performed at either of the data source locations (client 602 or the location associated with the data source 606), or at a still a different location. The data source sample may be obtained without merging the two source databases (612 and 606) since the record structure may be retained from the distributed dataset to the merged dataset. However, if record structure cannot be maintained, then the source data sample must be obtained after merger of the two sources (612 and 606). Generation of the target data signature and obtaining of the target data sample from a single data target is performed as mentioned herein.

Where the data target spans several network locations, the target signature and target sample may be obtained in the same manner as the spanning data source.

To further enhance the speed at which the signature and sampling processes may be performed, especially in a server environment, the server 604 may include a large amount of fast memory, e.g., RAM memory, which facilitates caching and combining the database snapshots for processing by the validation system 100. Of course, the system 100 may also include a sufficiently large amount of RAM memory to facilitate such high-speed operations in accordance with the present invention.

Figure 7:
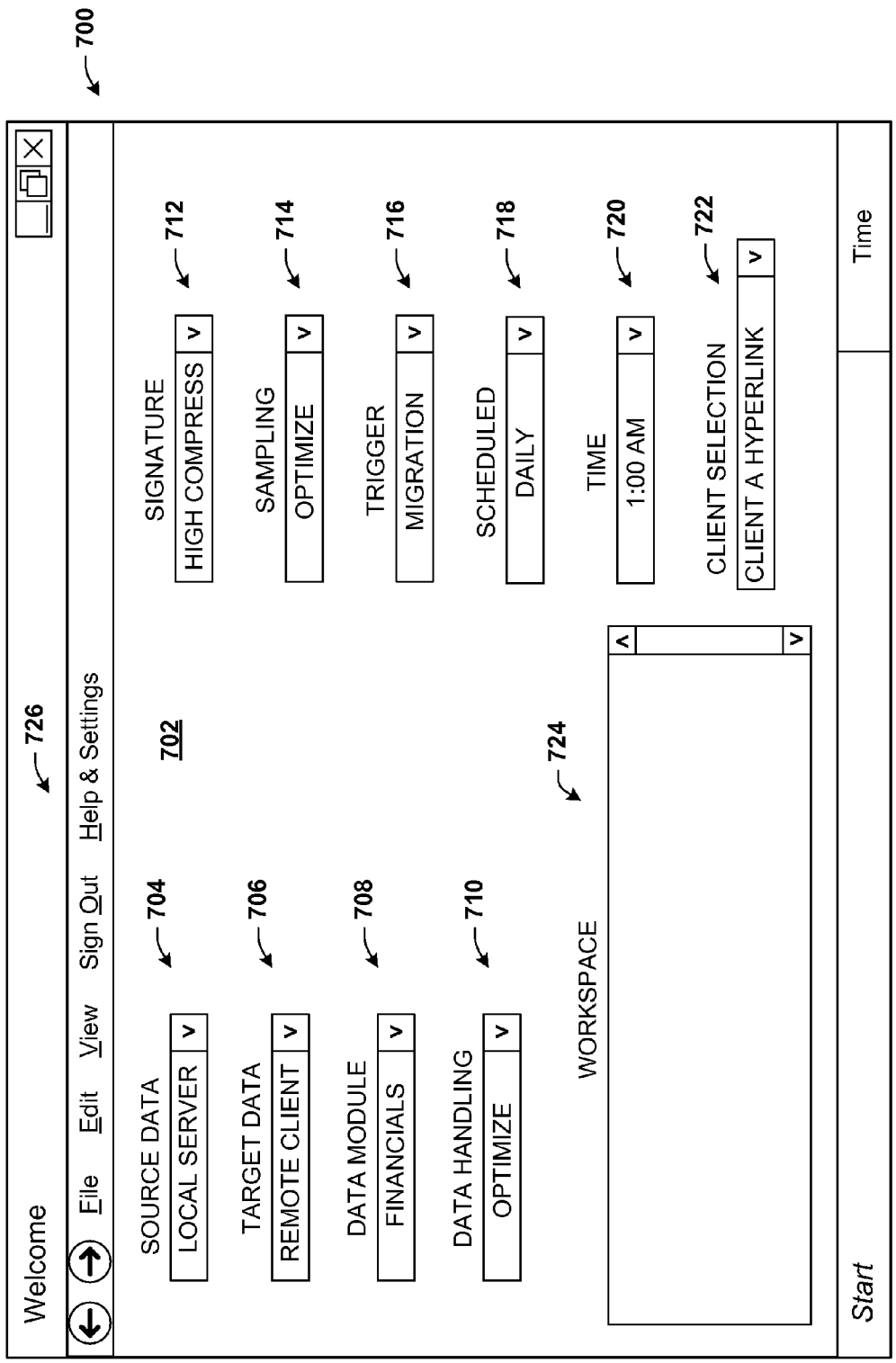
FIG. 7 illustrates an exemplary graphical user interface (GUI) for managing and interacting with the validation architecture of the present invention.

Referring now to FIG. 7, there is illustrated an examplary graphical user interface (GUI) 700 for managing and interacting with the validation architecture of the present invention. The GUI 700 includes an input component for receiving management information associated configuration of both the signature generation component and sampling component, and a presentation component for presenting a representation of the management information. The following is a description of the features of the GUI 700 in the context of a data migration from the source data to the target data. However, the searching illustration of FIG. 6 may also be managed by utilizing the GUI 700, by simply changing the number and type of user options, as is convention.

The GUI 700 presents a typical web page interface that provides conventional navigation and informational tools 726. The web page includes a content area 702 that presents to the user a number of selections for defining the implementation validation system of the present invention. For example, a Source Data menu 704 allows the user to select the source of the data. All menus provided herein are conventional drop-down menus allowing for single or multiple selections. Thus the Source Data menu 704 allows the user to select the location of the source data, ranging from a single source to a distributed database residing at multiple data locations. Similarly, a Target Data menu 706 allows the user to select the target data of the process, which may also be a single target data location, or a distributed database residing at multiple locations.

A Data Module menu 708 allows the user to focus the validation process on a particular data module. For example, the user may want to focus on the financials data of the data source and data target. As indicated before, the menuing system allows the user to chose one or more selections. Thus the user may select not only financials, but also any other data related or unrelated to it. A Data Handling menu 710 allows the user to determine whether to, for example, use optimization, such that a reduced set of data is used for the signature derivation, and for other features of the SVM described hereinabove. That is, if the source data is too large to process efficiently, and is determined to be a potential problem for the system, portions of the source data can be selected for validation processing. Other prioritization criteria may be input to facilitate this feature. Otherwise, the system operates under a normal state such that all of the source data and target data are used to generate the respective signatures.

The GUI 700 also presents a Signature menu 712 for selecting the sampling rate or degree of compression of the particular configuration. This may be presented to the user as a dual option such as HIGH/LOW for high sampling rate for low compression. That is, low compression indicates that all or a large amount of the source data will be used for the signature generation. Thus a high sampling rate is required to facilitate the compression process. The type of signature generation algorithm may also be presented as an option to the user (not shown). Thus the user could select DSSS, CRC, or binary string, or other such methods for generating the signatures. A Sampling menu 714 allows the user to select whether the sampling process may be set for optimization or normal states.

The GUI 700 may also include a Trigger menu 716 for automatically activating the validation architecture of the present invention according to one or more predetermined triggering events. For example, this menu may include a Migration option, such that if data is migrated from application version to another application version, the validation architecture will be applied automatically to certify the migration process. Additionally, this menu 716 may further include a prescheduled detection Time option for one or more data locations. Thus when a certain time is reached, the validation architecture automatically activates to run the validation process against the selected data source and target locations. In furtherance thereof, a Scheduled menu 718 and Time menu 720 is provided to schedule the Time triggering events.

It is to be appreciated that the illustrated GUI 700 presents only but a few of the user selections and options that may be included to further enhance the user management and control of the disclosed validation architecture. Thus the GUI 700 may include any number of additional user selection options not shown, limited only by the management desires of the user application. For example, a reporting option may be selected to send a report of the results to the user via any conventional method, e.g., e-mail and cell phone. The GUI 700 may include a user login option to restrict access to only authorized individuals. The GUI 700 may include a Validation Wizard that facilitates setup and configuration of the GUI 700. The GUI 700 may also include a Client Selection menu 722 that displays a client hyperlink that automatically connects the user to other client or database sites such as a website that allows access to, for example, the RDMS of the data source, data target, vendor website, and more. The GUI 700 may further be linked to an accounting system the automatically invoices a vendor according to the amount of data processed, the time utilized for processing the data, or for any other services contracted in conjunction with a provider of the disclosed architecture.

The GUI 700 may also include a Workspace area 724 that allows the user utilize command line control of any aspect of the validation architecture. The Workspace area 724 also facilitates the presentation of system notification information related to the status of the data validation and search processes described herein. For example, a status report may be presented here after data validation has completed.

Figure 8:
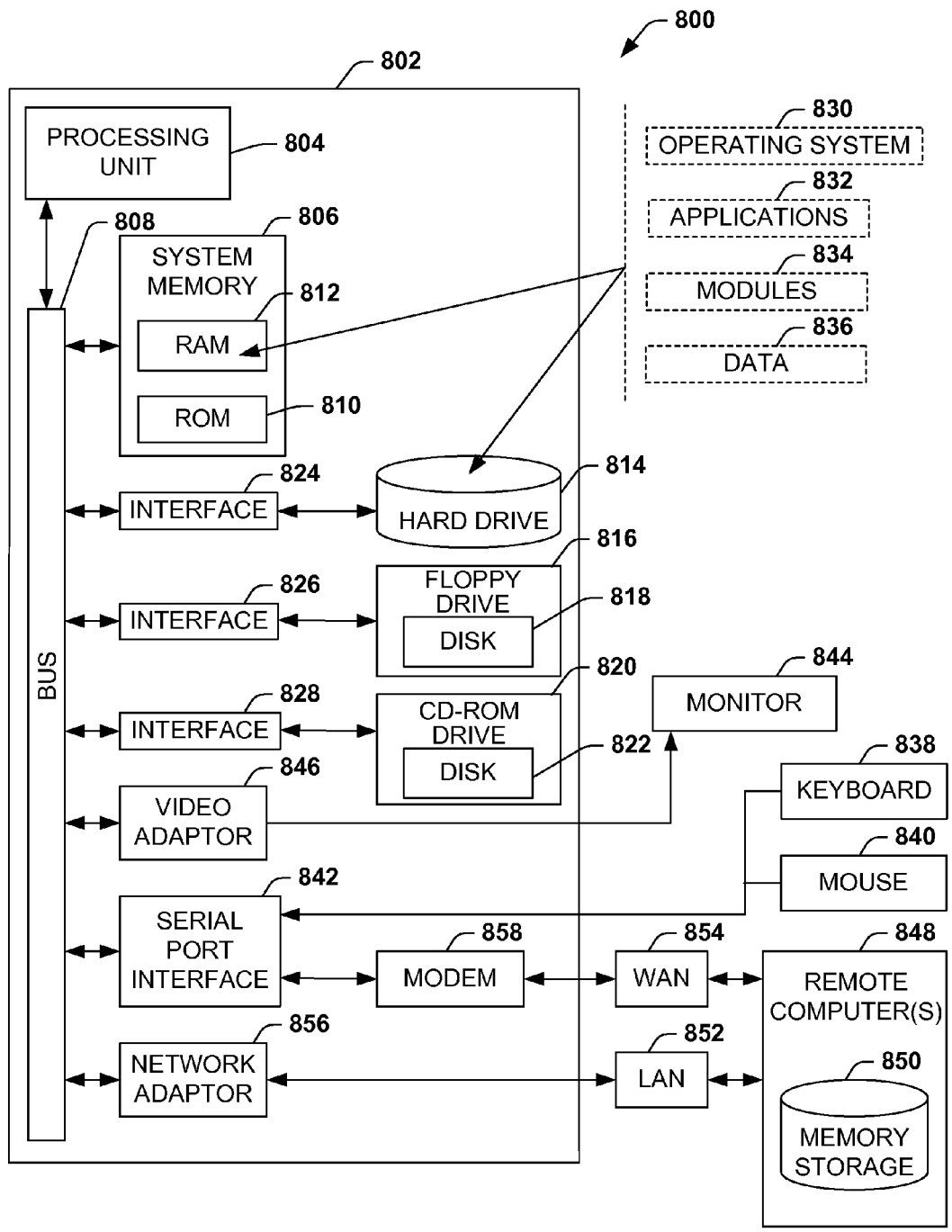
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 8, there is illustrated an exemplary environment 800 for implementing various aspects of the invention includes a computer 802, the computer 802 including a processing unit 804, a system memory 806 and a system bus 808. The system bus 808 couples system components including, but not limited to the system memory 806 to the processing unit 804. The processing unit 804 may be any of various commercially available processors. Dual microprocessors and other multi-processor architectures also can be employed as the processing unit 804.

The system bus 808 can be any of several types of bus structure including a memory bus or memory controller, a peripheral bus and a local bus using any of a variety of commercially available bus architectures. The system memory 806 includes read only memory (ROM) 810 and random access memory (RAM) 812. A basic input/output system (BIOS), containing the basic routines that help to transfer information between elements within the computer 802, such as during start-up, is stored in the ROM 810.

The computer 802 further includes a hard disk drive 814, a magnetic disk drive 816, (e.g., to read from or write to a removable disk 818) and an optical disk drive 820, (e.g., reading a CD-ROM disk 822 or to read from or write to other optical media). The hard disk drive 814, magnetic disk drive 816 and optical disk drive 820 can be connected to the system bus 808 by a hard disk drive interface 824, a magnetic disk drive interface 826 and an optical drive interface 828, respectively. The drives and their associated computer-readable media provide nonvolatile storage of data, data structures, computer-executable instructions, and so forth. For the computer 802, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 812, including an operating system 830, one or more application programs 832, other program modules 834 and program data 836. It is appreciated that the present invention can be implemented with various commercially available operating systems or combinations of operating systems.

A user can enter commands and information into the computer 802 through a keyboard 838 and a pointing device, such as a mouse 840. Other input devices (not shown) may include a microphone, an IR remote control, a joystick, a game pad, a satellite dish, a scanner, or the like. These and other input devices are often connected to the processing unit 804 through a serial port interface 842 that is coupled to the system bus 808, but may be connected by other interfaces, such as a parallel port, a game port, a universal serial bus ("USB"), an IR interface, etc. A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections to one or more remote computers, such as a remote computer(s) 848. The remote computer(s) 848 may be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include a local area network (LAN) 852 and a wide area network (WAN) 854. Such networking environments are commonplace in offices, enterprise-wide computer networks, intranets and the Internet.

When used in a LAN networking environment, the computer 802 is connected to the local network 852 through a network interface or adapter 856. The adaptor 856 may facilitate wired or wireless communication to the LAN 852, which may also include a wireless access point disposed thereon for communicating with the wireless adaptor 856. When used in a WAN networking environment, the computer 802 typically includes a modem 858, or is connected to a communications server on the LAN, or has other means for establishing communications over the WAN 854, such as the Internet. The modem 858, which may be internal or external, is connected to the system bus 808 via the serial port interface 842. In a networked environment, program modules depicted relative to the computer 802, or portions thereof, may be stored in the remote memory storage device 850. It will be appreciated that the network connections shown are exemplary and other means of establishing a communications link between the computers may be used.

Figure 9:
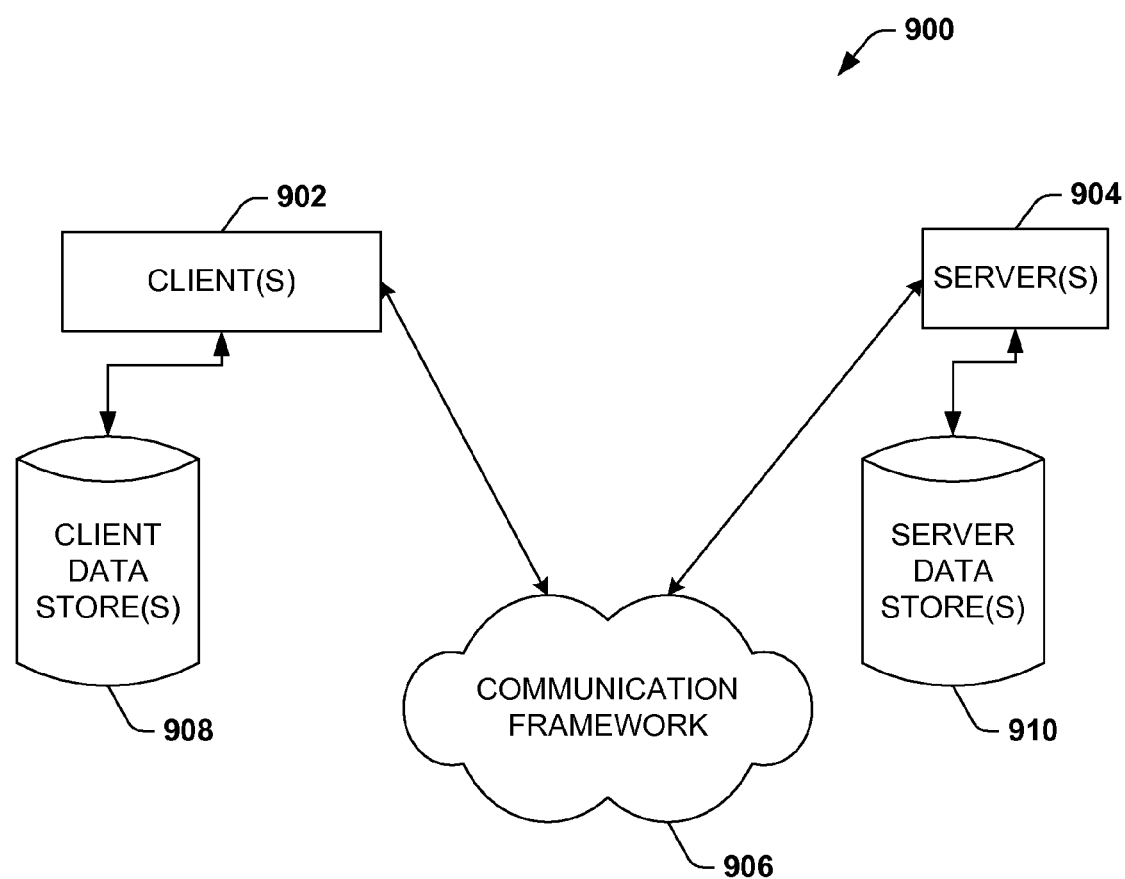
FIG. 9 illustrates a schematic block diagram of an exemplary computing environment in accordance with the present invention.

Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 may be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904. Communications may be facilitated via a wired (including optical fiber) and/or wireless technology. The client(s) 902 are operably connected to one or more client data store(s) 908 that can be employed to store information local to the client(s) 902 (e.g., cookie(s) and/or associated contextual information). Similarly, the server(s) 904 are operably connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that is at least partially executed upon a processor for facilitating validation of a mapping of data between a raw data source and a raw data target, comprising:
   determining at least one of a type of data or amount of the data of the raw data source to utilize for validation;
   determining at least one of a sampling rate or an amount of compression of the data for the raw data source and the raw data target;
   generating a source data signature of the raw data source and a target data signature of the raw data target utilizing the sampling rate, the amount of compression, or a combination thereof;
   obtaining respective data samples of the raw data source and the raw data target;
   processing the data samples and data signatures to determine status of a validation process through comparison of the sample the raw source data against corresponding raw target data as well as comparison of the source data signature against the target data signature; and transforming the signature compare result and the sample compare result into a construct in a logical manner.

2. The method of claim 1, further comprising determining one of a type of record that is used to obtain the data sample of the data source.

3. The method of claim 1, further comprising determining at least one of a type of the data or amount of the data of the data source to utilize for validation.

4. The method of claim 3, further comprising determining a weighting of at least a portion of the data source to determine which data source of a plurality of data sources should be used for validation or which portions of the selected data source will be used for validation.

5. The method of claim 1, wherein generating a source data signature of the raw data source comprises utilizing all of the data of the raw data source.

* * * * *